July 21, 1925.

W. J. KERR 1,546,387

ACCESSORY FOR MOTOR VEHICLES

Original Filed Nov. 15, 1920   2 Sheets-Sheet 1

INVENTOR:
WILLIAM J. KERR.
By Whiteley and Ruckman
ATTORNEYS.

July 21, 1925.  
W. J. KERR  
ACCESSORY FOR MOTOR VEHICLES  
Original Filed Nov. 15, 1920   2 Sheets—Sheet 2
1,546,387
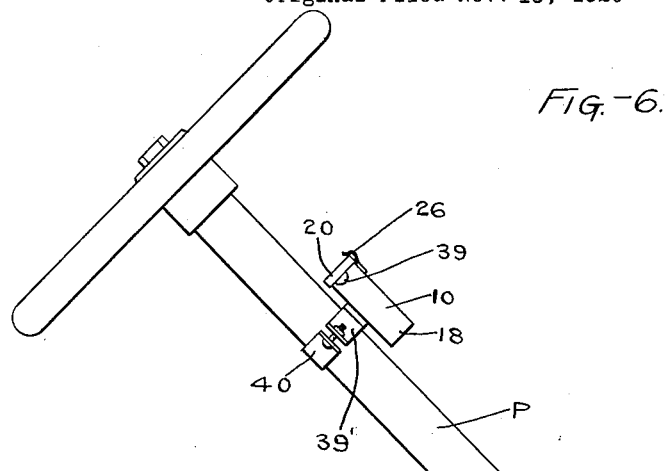
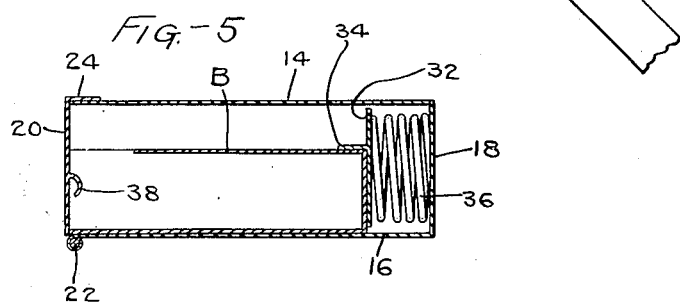
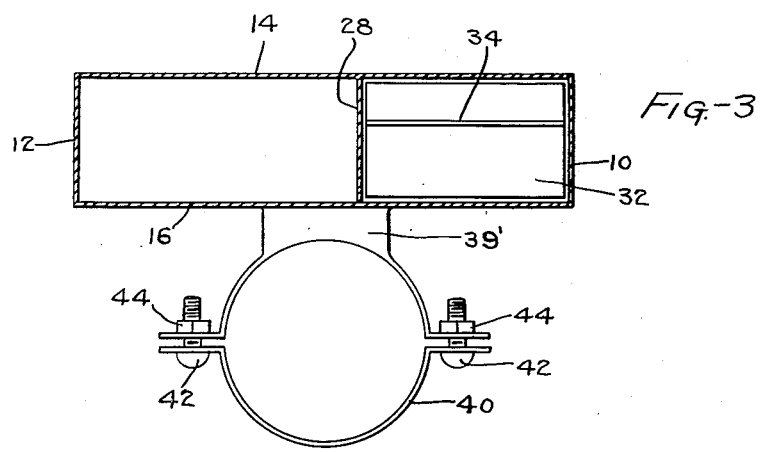
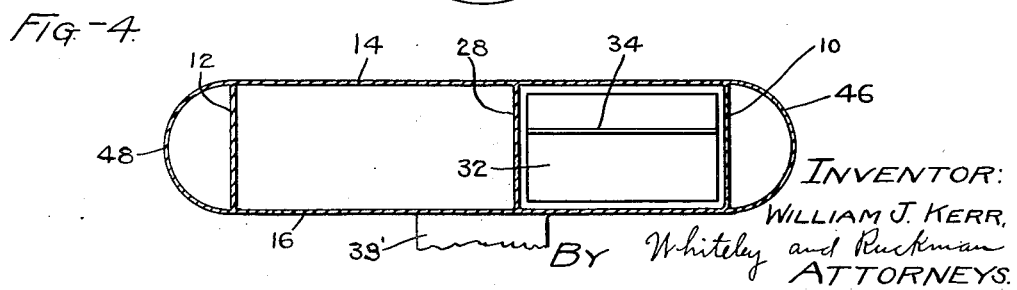
INVENTOR:  
WILLIAM J. KERR,  
BY Whiteley and Ruckman  
ATTORNEYS.

Patented July 21, 1925.

1,546,387

UNITED STATES PATENT OFFICE.

WILLIAM J. KERR, OF CHICAGO, ILLINOIS.

ACCESSORY FOR MOTOR VEHICLES.

Application filed November 15, 1920, Serial No. 424,268. Renewed December 8, 1924.

*To all whom it may concern:*

Be it known that I, WILLIAM J. KERR, a citizen of the United States, residing at Chicago, in the county of Cook and State of Illinois, have invented certain new and useful Improvements in Accessories for Motor Vehicles, of which the following is a specification.

My invention relates to accessories for motor vehicles. It relates more particularly to accessories for smokers' use, and an object is to provide a construction whereby all of the materials necessary for obtaining a smoke will be within easy reach of the driver who can perform all of the operations incident to obtaining and lighting a cigar or cigarette while one hand is kept constantly on the steering wheel. Another object is to provide a device of this character which may be readily attached to the steering post and which, when attached, will not detract from the appearance of an automobile but will on the contrary present an ornamental appearance.

The full objects and advantages of my invention will appear in connection with the detailed description thereof, and the novel features embodied in my inventive idea will be particularly pointed out in the claims.

Figure 1:
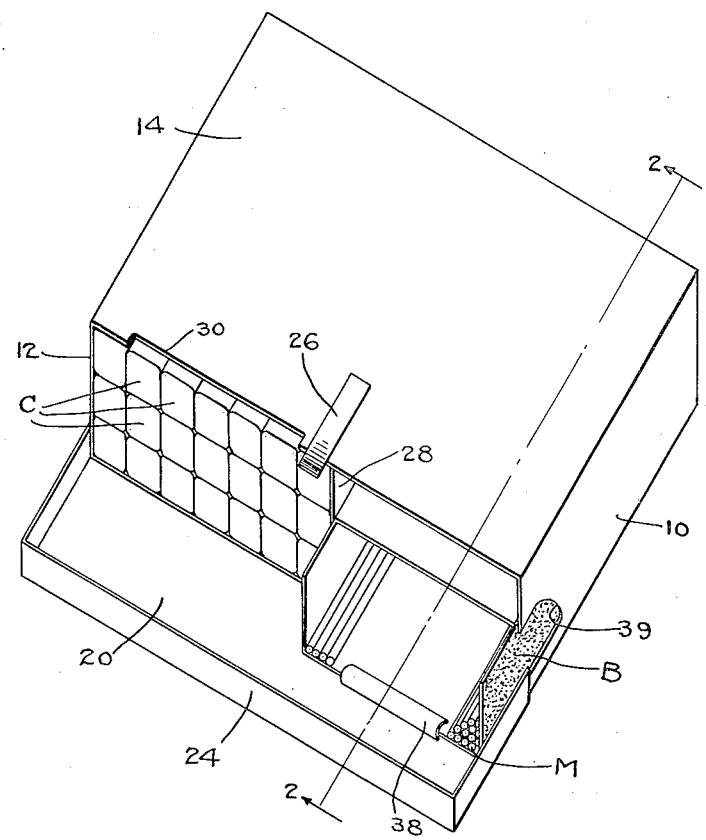
Figure 2:
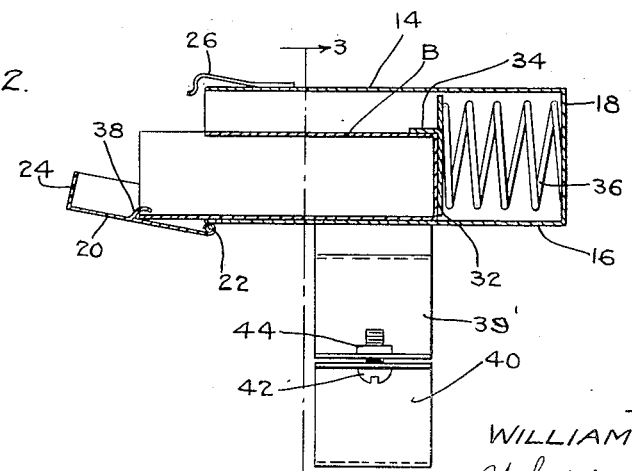

In the accompanying drawings which illustrate one of the embodiments which my invention may assume, Fig. 1 is a view in perspective of a receptacle detached from the steering post of a motor vehicle and with the closure of the receptacle in open position. Fig. 2 is a view in section on the line 2—2 of Fig. 1. Fig. 3 is a view in section on the line 3—3 of Fig. 2, the match box being removed. Fig. 4 is a view similar to Fig. 3 but showing a slight modification. Fig. 5 is a view similar to Fig. 2 but with the closure in its closed position. Fig. 6 is an elevational view showing the receptacle attached to a steering post.

The drawings show a receptacle which may be made from any suitable sheet material, and this receptacle has two end walls 10 and 12, two side walls 14 and 16, a bottom wall 18, and a closure 20, hinged to the wall 16 as indicated by the numeral 22 in Figs. 2 and 5. The closure is provided with a flange 24 adapted to fit over the walls 10, 12, and 14 when the closure is held in closed position by a suitable catch 26 which may be soldered or otherwise attached to the wall 14. In the embodiment shown, the receptacle is divided by a partition 28 into two compartments, one of which is adapted to receive cigars or cigarettes indicated at C, and, in order that the cigars or cigarettes may be readily removed, the wall 14 is preferably cut away slightly as indicated at 30 in Fig. 1. The other compartment is adapted to receive a match box B containing matches M. The latter compartment is provided with a follower 32 for contacting with the rear of the match box, and the follower has a flange 34 for engaging over the match box and is backed up by a spring 36. The closure 20 is provided with an inwardly extending lip 38 for a purpose which will presently appear. The wall 10 may be cut away as shown at 39 in order to expose more surface of the match box upon which to strike matches. To the wall 16 of the receptacle is attached one member 39' of a two-part clamp, the other member 40 of this clamp being adjustably connected to the first member by bolts 42 provided with nuts 44, the bolts extending through flanges on the two members, as best shown in Fig. 3. The clamp serves for attaching the receptacle to the steering post P of a motor vehicle as shown in Fig. 6, the adjustability of the clamp permitting adjustment to different sized posts. The construction shown in Fig. 4 is the same as that shown in the other figures with the exception that curved walls 46 and 48 are placed outside the walls 10 and 12 to give a more pleasing appearance.

The operation and advantages of my invention will be obvious from the foregoing description. The receptacle is secured to the steering post in such position that it is within easy reach of the driver of the motor vehicle. When the driver wishes to enjoy a smoke, it is merely necessary to remove one hand from the steering wheel and with only a few movements of his free hand his cigar or cigarette is lighted and the receptacle is closed and ready for the next smoke. First, he operates the catch for the closure; second, he extracts a cigar or cigarette and places it in his mouth; third, he extracts a match from the match box; fourth, he strikes the match on the side of the match box; fifth, he applies the lighted match to the cigar or cigarette; and, sixth, he pushes the closure shut. When the catch 26 is operated to release the closure 20, the tension of the spring 36 tends to force the match box out of the receptacle, and this causes the closure to open. When the match box has been partially protruded from the receptacle as shown in Fig. 2, it comes into engagement with the lip 38 and further outward movement of the match box is prevented. When my device is in position upon the steering post, the driver has the materials within easy reach, and is able to perform all of the operations involved in producing the smoking materials and obtaining a light, without the necessity of fumbling in his pockets and with one hand remaining on the steering wheel, thereby avoiding danger of losing control of the vehicle.

I claim:

1. An accessory for motor vehicles comprising a receptacle for a match box and other smoker's material, a closure for said receptacle, a catch for holding said closure in a closed position, a follower in said receptacle adapted to engage the rear face of the match box, a spring to back up said follower and cause said closure to open and the match box to protrude when said catch is released, a lip on said closure which limits the protrusion of the match box, and means for attaching said receptacle to a motor vehicle.

2. An accessory for motor vehicles comprising a receptacle, a partition dividing said receptacle into two compartments, one for a match box and the other for cigars and cigarettes, a closure for closing both of said compartments, a catch for holding said closure in closed position, the wall of said receptacle being cut away at the front upper edge of said cigar and cigarette compartment, a follower in said match box compartment for engaging the rear of the match box, a spring to back up said follower and cause said closure to open and the match box to protrude when said catch is released, and means for attaching said receptacle to a motor vehicle.

3. An accessory for motor vehicles comprising a receptacle, a partition dividing said receptacle into compartments for a match box and other smoker's material, a closure for said receptacle, a catch for holding said closure in closed position, a spring in said receptacle which causes said closure to open and the match box to protrude when said catch is released, means for limiting the outward movement of the match box, and means for attaching said receptacle to the steering post of a motor vehicle.

4. An accessory for motor vehicles comprising a receptacle for a match box and other smoker's material, a closure for said receptacle, a catch for holding said closure in closed position, a follower in said receptacle adapted to engage the rear of the match box, a flange on said follower adapted to engage over the match box, a spring to back up said follower and cause said closure to open and the match box to protrude when said catch is released, a lip on said closure which limits the protrusion of the match box, and means for attaching said receptacle to the steering post of a motor vehicle.

In testimony whereof I hereunto affix my signature.

WILLIAM J. KERR.